June 29, 1943.   L. F. ROGERS   2,322,885
METHOD OF MAKING CLOSURES FOR COLLAPSIBLE
TUBES AND THE LIKE
Filed May 3, 1939
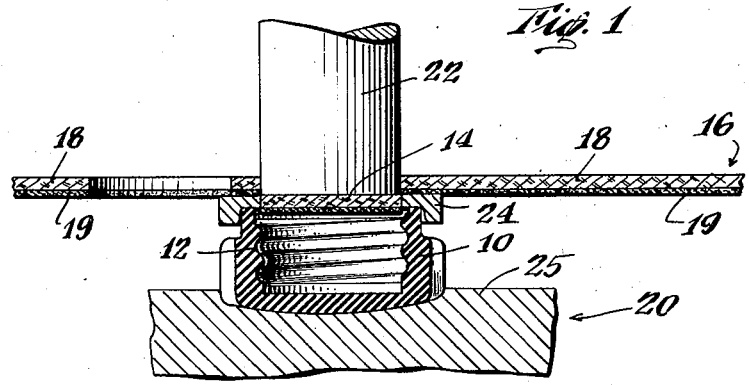
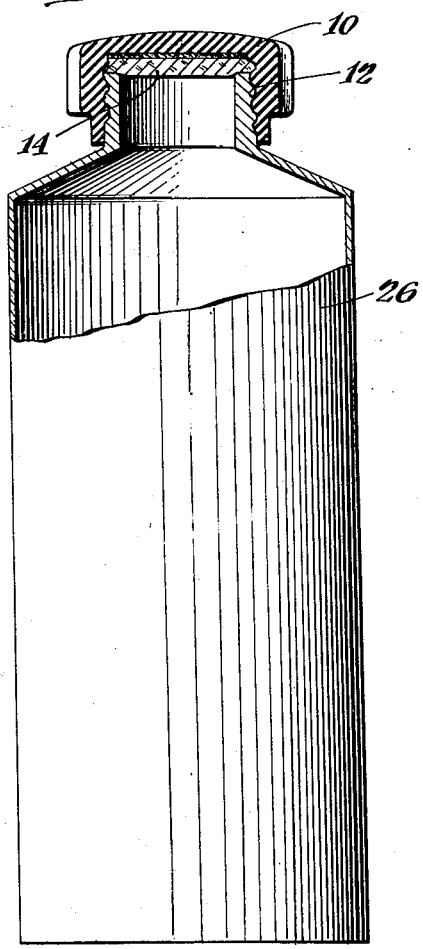
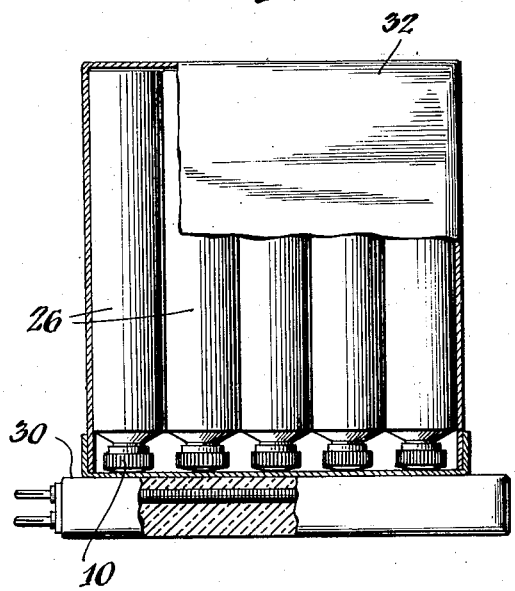
INVENTOR
*Louis F. Rogers*
BY
*Hoguet, Neary & Campbell*
*his* ATTORNEYS Patented June 29, 1943

2,322,885

UNITED STATES PATENT OFFICE 2,322,885

METHOD OF MAKING CLOSURES FOR COLLAPSIBLE TUBES AND THE LIKE

Louis F. Rogers, Wilmington, Del., assignor to Bond Manufacturing Corporation, Inc., a corporation of Delaware Application May 3, 1939, Serial No. 271,498

4 Claims. (Cl. 113—80)

This invention relates to the manufacture of closures and more particularly to an economical and speedy method of forming and securing sealing disks or liners to closures intended for use with collapsible tubes and the like.

Closures of this type usually comprise a shell made of metal or a suitable molded composition such as Bakelite and a sealing disk or liner made of cork, cork composition, fiber board, felt paper or the like. Since the closures must be produced relatively inexpensively and at a rapid rate, the sealing disk or liner in the prior commercial practice has usually been merely inserted within the closure shell, reliance being had upon the close-fitting engagement of the disk with the side walls of the shell to cause it to remain in position when the cap is used. This procedure is unsatisfactory because the sealing disk frequently drops out or is pulled away from the closure when the closure is removed from the collapsible tube or other container to which it is applied.

In making closures of a somewhat different type, namely, crown caps, various procedures involving the use of an adhesive or cement interposed between the sealing disk and the shell have been suggested for securing the sealing disks or liners to the closure shells. However, difficulties are met with in applying the adhesive in closely regulated amounts and in bringing about the desired bonding to the shell. Such procedures have not, therefore, pointed the way to any solution of the problem of bonding sealing disks or liners of the type used with collapsible tubes, which, as above stated, must be made and assembled very cheaply and at a rapid rate.

The present invention has for an object to provide a method of forming and positively securing or bonding sealing disks to closure shells adapted for use with collapsible tubes and the like.

The invention has for a further object to provide an improved method for forming and securing sealing disks to closure shells of various types other than those intended for use with collapsible tubes, which has, among other advantages as compared with the prior practices, the advantages that it may be carried out under rapid mass production conditions and that the bonding of the disks to the closure shells is made more certain and uniformly effective.

The present invention in one of its important aspects involves the bonding of an interposed adhesive to the liner and to the closure shell by holding the disk under pressure in contact with the closure shell, while maintaining the temperature and other conditions appropriate to effect the desired bonding of the interposed adhesive to the liner and to the closure shell.

Another important feature of the invention resides in the use of liner material which has been prepared in sheets or strips backed with an adhesive which under ordinary temperature conditions is in a solid or at least a non-tacky state, but which under the influence of pressure or heat and pressure will act to bond together a liner and closure shell between which it is interposed.

Further features and advantages of the invention will become apparent from the following general description of the invention as well as from the later more detailed description.

In its broader aspects the invention may be regarded as including the steps of first forming or providing a sealing disk with a surface thereof coated with a suitable adhesive, inserting the disk into a closure shell with the coated surface of the disk in contact with the shell, screwing or otherwise securing the closure assembly upon the container and causing the disk with the interposed adhesive to be brought into pressure engagement with the shell and, while the closure assembly is thus under pressure, maintaining heat conditions appropriate to promote the bonding of the adhesive with the closure shell.

The closure shell and the coated disk may be subjected to heat before, during or after the assembly has been secured to the container. In some cases it will suffice to heat the coated disk alone before the assembling operation. The method permits of a wide range of choice as to the stage in the operation at which the heating required for the bonding operation is to be applied. It also makes it possible to dispense with a special heating step and instead, to utilize the heat conditions required in some step in the manufacture of the container or even in the filling of the container by the customer to whom the container is sold. For example, collapsible tubes and similar containers are often decorated by procedures involving the application of heat to bake the enamel or other decoration. Likewise, in some cases, collapsible tubes or other containers to which lined closures are applied are "hot packed," i. e., they are filled with a material in a heated condition or heat is applied to the container while it is being filled or after it is filled. In such cases the closure assembly may be formed and secured to the container to place the disk and adhesive under pressure entirely by "cold" operations, the bond between the disk and closure shell being effected by heat from the material packed in the container or by heat from the decorating process, as the case may be.

I have further discovered that the closure assembly may be heated sufficiently to produce the bond after the containers have been placed in cartons for shipment. In this case, the closures may be prepared and secured to a container by "cold" operations and packed in cartons for shipment. The cartons are then positioned on or moved over a heated surface with that side of the cartons adjacent the closures in contact with the heated surface. In this way, the closures will absorb sufficient heat to soften the adhesive and, since the adhesive and the disks of each closure are under pressure, a proper bond will be effected when the adhesive is allowed to cool.

Collapsible tubes are generally shipped by the tube manufacturer to his customer with the closures secured thereto, the opposite end of each tube being left open to receive the material for which the container is intended. After the intended contents have been added the open end is folded and pressed together to complete the sealing of the container. It will be seen from the preceding description that my method fits in particularly well with this existing practice because it utilizes the essential step in such practice of securing the caps to the containers before shipment to the customer.

When using liner material in sheets or strips backed with a normally solid or non-tacky adhesive, I may feed these strips into an assembly machine where the liner disks are punched from the strips directly into the closure shells with the adhesive-backed side adjacent the crown of each shell. This insures that the mass production of the closure assemblies may proceed rapidly.

The side of the sheet or strip opposite the adhesive backing may be treated or coated before the punching operation to provide any desired facing. This is important where the intended contents of the container are of such nature as to tend to attack the liner or, vice versa, where there might be a tendency for components of the liner to contaminate the contents of the container.

The above and other objects and advantages of the invention will become further apparent upon consideration of the following description when taken in connection with the accompanying drawing, in which:

Figure 1 is a view in sectional elevation of parts of an assembly machine, showing a disk being punched from the liner material directly into a closure shell;

Figure 2 is an elevational view with parts in section of a collapsible tube having a closure tightly secured thereto; and Figure 3 is an elevational view of a shipping carton and a heating element with parts broken away to show the relative position of the containers with respect to the surface of the heating element.

The types of closures to which the invention is best suited are those provided with screw threads, screwable lugs or other fastening means whereby the closure may be secured to a container to be sealed with a resultant pressure on the sealing disk. Referring to Figs. 1 and 2 of the drawing, a closure 10 is shown for purposes of illustration provided with screw threads 12. The closure shell may be of metal, synthetic composition, such as Bakelite, or any other suitable material, the shell being provided with a resilient disk 14 to effect a proper seal when the shell is tightly secured to a container. Disks 14 are preferably cut from strips or sheets of liner material 16 comprising a resilient material 18 of cork composition, fiber board, felt paper, or the like, backed with a coating or layer of a suitable adhesive 19. Where it is desirable to provide the disk with a special coating or facing, the side of the liner material opposite the adhesive backing may be treated or coated to provide the desired facing while the material is in sheet form.

The adhesive employed should be one that exists in solid form or at least is substantailly non-tacky at ordinary temperatures. This characteristic is desirable since it facilitates the handling of strips of liner material during the disk forming and closure assembling operations. At the same time the adhesive should be capable of being softened or rendered sticky or fluid by the application of heat and pressure. Adhesives of either the thermo-setting type or the permanently thermoplastic type may be used. Those of the permanently thermoplastic type are usually preferred because there are many adhesives of this type that can be softened or rendered adhesively active to the extent desired by heating at moderate temperatures well within the range of heating conditions frequently required in performing some other operation in the manufacture of containers and closures of the type to which the present invention is addressed, as for example, in decorating collapsible tubes. Examples of thermoplastic adhesive materials that I have found to be well adapted for this purpose are guttapercha and the thermoplastic adhesive known as Du Pont No. 4620. Glyptal resins and combinations of glyptal resins and cellulose derivatives, e. g., nitrocellulose or ethyl cellulose, may be used. Many others will suggest themselves.

Where, in the claims, I have used the term "thermoplastic adhesive," it is to be understood as used in the broad sense to include any adhesive that may be rendered plastic or tacky under the influence of heat under the conditions recited, including not only those adhesives that remain thermoplastic after repeated applications of heat but also those that are thermo-setting in character.

The adhesive may be applied to the sheets or strips of liner material in any convenient way, as for example, by dusting the adhesive material in solid powdered form on the sheet and then applying heat to soften or fuse the adhesive, or it may be applied in a fluid condition in any well known manner and then caused to solidify or assume a non-tacky state, as by cooling from a hot fluid state or by evaporating a volatile solvent associated therewith. It is important, however, if heat is used in applying the adhesive, that the adhesive be of a character that will not permanently set upon cooling at this stage of the process. A further and highly satisfactory method of preparing the adhesive backed sheets or strips consist in providing an adhesive material such as guttapercha in thin sheets or strips, superposing such a strip or strips on the sheet of liner material and then calendering with or without heat to promote adherence of the adhesive strip to the liner material.

Strips of liner material 16 backed with adhesive are fed to an assembly machine, shown diagrammatically at 20, wherein disks 14 may be punched out by a punch 22 from the strip directly into the closure shell 10 held in alignment with the punch 22 by centering and supporting members 24 and 25. As soon as the closure shell has received its disk 14 and the punch 22 has been retracted, the shell and disk may be transferred by mechanism (not shown) and tightly secured onto a container 26.

When closure shells made of metal or other relatively high heat conductive material are used, the closure assembly may be heated while within the assembly machine and just prior to the fastening of the closure onto the container 26, or the heating step may be carried out after the closure is secured to the container. According to either procedure, pressure is exerted upon the adhesive and disk by the fastening means while the assembly is in a heated state and this operates to promote a bond between the disk and closure shell when the adhesive is permitted to cool. When closure shells of Bakelite, or other relatively low heat conductive material, are used, it is generally more satisfactory to apply the heat after the closure has passed the assembly machine and has been secured to the container.

The heating step may be considerably varied in relation to the step of placing the disk into the closure shell and the step of securing the shell to a container. For example, the closure shell may be heated while in position on the member 25 either prior to or during the reception of the disk or directly thereafter, or the shell may be heated by another part of the assembly machine or other device prior to or during the securing of the closure to the container. Then again, the heat may not be applied to the closure until after the closure has been tightly secured to the container.

Where containers are to be decorated by a process including a heating step, the heat thereof may be utilized to soften the adhesive, the closure being assembled and secured to the container by "cold" operations. The collapsible tube type of container is an example of a container capable of being decorated before the filling operation and after the closure has been applied. With the closure secured tightly to the tube, the tube may thereafter be decorated by a hot process and the adhesive 19 sufficiently softened by the heat applied to the tube to become tacky and thereby cause the disk to effectively adhere to the crown of the closure when permitted to cool. In this way the threads or other fastening means of the closure serve as the means by which the necessary pressure is supplied and the decorating process affords the heat to effect the requisite bond necessary to prevent the disk from separating from the closure shell and adhering to the container when the closure is removed.

Where the containers are not decorated or are decorated without use of heat, the heat required to effect the bond may be applied to the closure after the closure has been tightly secured to the container either severally or in groups. As illustrated in Fig. 3, the containers with the closures tightly secured thereto may be packed in cartons 32 for shipment to plants where the containers are filled through the bottom or open end, the end portions being thereafter folded and pressed together to complete the sealing of the containers for marketing. The sides of the cartons adjacent the closures 10 may be moved across or allowed to rest on a heated surface 30 for a sufficient period of time to insure that the closures are heated sufficiently to render the adhesive tacky and promote the bonding of the liner to the closure shell.

Where the containers are "hot packed," the closure assembly may be first tightly secured upon the container to place the adhesive and disk under pressure, the heat of the material sealed within the container being sufficent to soften the adhesive and thereby produce the requisite bond between the disk and the closure shell. In this case, as in the case involving a hot decorating process, no special heating step is necessary in connection with the manufacture and securing of the closure to the container.

The bonding of the liner to the shell has been hereinbefore more specifically described as effected by heating the closure assembly while pressing the sealing disk against the closure shell, or, vice versa, by pressing the sealing disk against the closure shell while the shell or the assembly of the sealing disk and shell is in a heated state. However, it will be understood that the simultaneous application or maintenance of heat and pressure is not always essential. I have found that certain substances, for example, guttapercha, do not lose their bonding characteristics immediately upon cooling to normal temperature but will remain capable of effecting a bond between the liner and the closure shell upon mere application of pressure and while cold, and that this capability persists for a substantial period—in the case of guttapercha, up to twenty-four hours. This makes it practical to heat the closure assemblies at a stage and at a point of time considerably prior to the step of securing the closures onto the containers with the interposed disks under pressure, then permit the closures to cool and thereafter, within the period in which the guttapercha still remains tacky or adhesive, secure the closures to the containers and impose the desired pressure upon the interposed disks. A convenient way of heating the closure assemblies is by means of a double boiler, the heat so applied being sufficient to render the guttapercha tacky and this condition will persist for upwards of twenty-four hours.

While several variations of my invention have been described, it is readily apparent that many other variations are possible. It is to be understood, therefore, that the invention is not to be restricted except in so far as is necessitated by the prior art and the appended claims.

Where, in the claims, I have used the expression "collapsible tubes and the like," it is to be understood that the comparative words "and the like" are intended to include containers adapted to be closed by a closure provided with screw threads, screwable lugs or other fastening means permitting of repeated attachment and detachment of the closure to and from the container, whereby the closure may be secured to a container to be sealed with a resultant pressure on an interposed sealing disk.

I claim:

1. In the manufacture of closures for collapsible tubes and the like, the steps which include providing a sealing disk having a surface thereof coated with a thermoplastic adhesive, inserting said disk into a closure shell with the coated surface of the disk in direct contact with a wall thereof, tightly fastening the closure assembly upon a collapsible tube and thereby pressing said sealing disk and the interposed adhesive against said closure shell, heating the closure assembly sufficiently to soften the adhesive, and finally causing the assembly to cool while maintaining the sealing disk under pressure by the secured closure.

2. In the manufacture of closures for collapsible tubes and the like, the steps which include providing a strip of cushion liner material carrying a coating of a thermoplastic adhesive, severing a sealing disk from the coated strip and, as a part of the same operation, inserting said disk into a closure shell with the coated side of the disk in contact with a wall of said shell, heating the closure assembly sufficiently to soften the adhesive, securing the closure assembly upon a collapsible tube to be sealed and thereby pressing said sealing disk and the interposed adhesive against said closure shell, and finally causing the closure assembly to cool while the sealing disk is held under pressure by the secured closure.

3. In the manufacture of closures for collapsible tubes and the like, the steps which include providing a strip of cushion liner material carrying a coating of a thermoplastic adhesive, severing a sealing disk from the coated strip and depositing it directly as severed into a closure shell with the coated side of the disk in contact with a wall of said shell, thereafter heating the closure assembly sufficiently to soften the adhesive, securing the closure assembly upon a collapsible tube while the adhesive is still soft and thereby pressing the sealing disk against said shell, and finally causing the closure assembly to cool while holding the sealing disk under pressure by the secured closure.

4. In the manufacture of closures for collapsible tubes and the like, the steps which include providing a strip of cushion liner material carrying a coating of a thermoplastic adhesive, severing a sealing disk from the coated strip and depositing it directly as severed into a closure shell with the coated side of the disk in contact with a wall of said shell, securing the closure assembly upon a collapsible tube and thereby pressing the sealing disk and the interposed adhesive against said closure shell, thereafter, while the closure assembly remains so secured to the tube, heating the closure assembly sufficiently to soften the adhesive and promote adherence between the sealing disk and the closure shell, and finally causing the closure assembly to cool while holding the sealing disk under pressure by the secured closure.

LOUIS F. ROGERS.

CERTIFICATE OF CORRECTION.

Patent No. 2,322,885.                                         June 29, 1943.

LOUIS F. ROGERS.

It is hereby certified that error appears in the printed specification of the above numbered patent requiring correction as follows: Page 1, second column, line 34, for "coated disk" read --closure shell--; page 2, second column, line 65, for "consist" read --consists--; and that the said Letters Patent should be read with this correction therein that the same may conform to the record of the case in the Patent Office.

Signed and sealed this 24th day of August, A. D. 1943.

(Seal)
                                                Henry Van Arsdale,
                                   Acting Commissioner of Patents.